(12) United States Patent
Endo et al.

(10) Patent No.: US 7,019,798 B2
(45) Date of Patent: Mar. 28, 2006

(54) DISPLAY DEVICE

(75) Inventors: Takeshi Endo, Osaka (JP); Ichiro Kasai, Toyonaka (JP)

(73) Assignee: Minolta Co., Ltd., Osaka (JP)

( * ) Notice: Subject to any disclaimer, the term of this patent is extended or adjusted under 35 U.S.C. 154(b) by 86 days.

(21) Appl. No.: 10/355,804

(22) Filed: Jan. 31, 2003

(65) Prior Publication Data

US 2003/0179423 A1   Sep. 25, 2003

(30) Foreign Application Priority Data

Feb. 25, 2002   (JP)   ............................. 2002-047411

(51) Int. Cl.
*G02F 1/1335* (2006.01)

(52) U.S. Cl. ............................. 349/61; 359/15; 359/20

(58) Field of Classification Search ................. 349/61, 349/68, 113, 114; 359/15, 20
See application file for complete search history.

(56) References Cited

U.S. PATENT DOCUMENTS

| | | | |
|---|---|---|---|
| 5,475,512 A | 12/1995 | Nakazawa et al. | 359/13 |
| 5,999,282 A * | 12/1999 | Suzuki et al. | 359/20 |
| 6,396,463 B1 | 5/2002 | Tomono | 345/8 |
| 6,429,954 B1 | 8/2002 | Kasai | 359/13 |

FOREIGN PATENT DOCUMENTS

| | | |
|---|---|---|
| JP | 04-118620 A | 4/1992 |
| JP | 07-212680 A | 8/1995 |
| JP | 10-268308 A | 10/1998 |
| JP | 2000-122589 A | 4/2000 |
| JP | 2000-206517 A | 7/2000 |
| JP | 2000-267042 A | 9/2000 |
| JP | 2001-004956 A | 1/2001 |

* cited by examiner

*Primary Examiner*—Andrew Schechter
*Assistant Examiner*—George Y. Wang
(74) *Attorney, Agent, or Firm*—Sidley Austin LLP

(57) ABSTRACT

A display device has a plurality of light emitting elements for emitting lights, a display element for modulating the light emitting from the plurality of light emitting elements so as to convert it to an image light showing an optical image, a reflection type hologram element, having a positive optical power with respect to the lights from the plural light emitting elements, for diffracting and reflecting the lights from the plural light emitting elements to approximately one direction so as to guide the diffracted and reflected lights to the display element; and an enlarging optical system for forming an enlarged image of the optical image converted by the lights from the image display element. The plural light emitting elements are positioned in a plane approximately vertical to an optical path of the lights diffracted and reflected by the hologram element. The hologram element is tilted to a direction facing the plural light emitting elements with respect to the optical path of the lights diffracted and reflected by the hologram element.

11 Claims, 19 Drawing Sheets

6

DISPLAY DEVICE

RELATED APPLICATION

This application is based on Application No. 2002-47411 filed in Japan, the content of which is hereby incorporated by reference.

BACKGROUND OF THE INVENTION

1. Field of the Invention

The present invention relates to a display device which has an image display element which modulates an illumination light to convert it into a light showing an image, and particularly relates to its illumination optical system.

2. Description of the Prior Art

A display device, which has a liquid crystal display for modulating a given illumination light to convert it into a light showing an image and an eyepiece optical system for guiding the light from the liquid crystal display to an eye so as to provide a virtual image of the image, are used a lot as small image providing means. Such a display device optically conjugates a light source surface emitting the illumination light and the eye of an observer so as to provide a bright image. Moreover, in the case where a color image is provided, the display device generally adopts one of a first method of providing a color filter to individual pixels of the liquid crystal display and modulating white lights as illumination lights collectively and a second method of giving illumination lights with different wavelengths in a manner that time is staggered so as to modulate the respective illumination lights individually.

The first method may have only one light source for emitting a white light, and thus the structure is simple. However, since some pixels of all the pixels of the image display element modulate the lights with respective wavelengths, resolution is low. The second method should have a plurality of light sources and an optical system for guiding lights from the light sources from the same direction to the image display element, and thus the structure is rather complicated. However, since the lights with wavelengths are modulated by all the pixels of the image display element, the resolution is high. In order that the first method provides an image with the same resolution as that in the second method, it is necessary to use a liquid crystal display having a lot of pixels, but since heightening of density of the pixels is limited, enlarging of the liquid crystal display is inevitable. Moreover, when the liquid crystal display is large, a diameter of the optical system for illuminating the display also increases. Therefore, in order to keep the display device small and simultaneously heighten the resolution of a color image to be provided, the second method is preferable.

In the case where the color image is provided by the second method, there arises a problem that irregular brightness and color shading on the light source surface become irregular brightness and color shading on eye surface of an observer. Particularly, the color shading on the light source surface causes lowering of image quality remarkably when the observer shifts his eyes. In order to avoid this, it is necessary to unify color on the light source surface (mix colors). This is generally is realized by arranging a plurality of lights emitting elements for emitting lights with different wavelengths and arranging a diffusing plate in a position which is separated from the light emitting elements. However, with this structure, use efficiency of lights is lowered and miniaturization of the optical system is restricted.

Therefore, it is suggested that optical paths of lights from the plural light emitting elements are superposed by a multilayered film mirror or a reflection type hologram element. They can be used for illuminating a transmission type liquid crystal display and illuminating a reflection type liquid crystal display, but an inexpensive reflection type hologram element which is manufactured by the less steps is more suitable for practical use than an expensive multilayered film mirror which is manufactured by the more steps.

FIG. 17 shows a structure of a display device having a reflection type hologram element. The display device 8 is composed of three light emitting diodes 81R, 81G and 81B for emitting a red (R) light, a green (G) light and a blue (B) light, a hologram element 82, a transmission type liquid crystal display 83 and an eyepiece optical system 85. Lights from the light emitting diodes 81R, 81G and 81B are diffracted to be reflected by the hologram element 82 so as to be guided to the liquid crystal display 83. The hologram element 82 diffracts and reflects the lights from the three light emitting diodes 81R, 81G and 81B to one direction and converts the diffracted and reflected lights into parallel light fluxes. Moreover, the three light emitting diodes 81R, 81G and 81B are arranged on a flat surface which is parallel with an optical path of the diffracted and reflected lights L by means of the hologram element 82 and on an arc, a center of which is one point on the hologram element 82.

FIG. 18 shows a structure of a hologram exposing device to be used for manufacturing the hologram element 82. This device 9 is composed of three laser light sources 91R, 91G and 91B, three mirrors 92a, 92b and 92c, a beam splitter 93, a beam expander 94, two mirrors 95a and 95b and a pin hole plate 96 provided with a pin hole 96a. The laser light sources 91R, 91G and 91B emit laser beams with wavelengths approximately equal with wavelengths of the lights emitted from the light emitting diodes 81R, 81G and 81B.

The mirror 92a reflects a laser beam from the light source 91R. The mirror 92b reflects a laser beam from the light source 91G and allows the laser beam from the mirror 92a to transmit. The mirror 92c allows the laser beam from the light source 91B to transmit and reflects the laser beam from the mirror 92b. The laser beams from the laser light sources 91R, 91G and 91B advance to one direction via the mirrors 92a, 92b and 92c.

The beam splitter 93 branches the laser beam from the mirror 92c into a transmitted light and a reflected light, and the beam expander 94 expandes a light flux diameter of the laser beam transmitted through the beam splitter 93. The mirror 95a reflects the laser beam reflected by the beam splitter 93, and the mirror 95b further reflects the laser beam from the mirror 95a so as to allow it to cross the laser beam transmitted through the beam expander 94. The pin hole plate 96 allows the laser beam from the mirror 95b to pass through the pin hole 96a so as to convert it into a divergent pencil of lights.

A substrate 82a coated with a hologram sensitizer, namely, an original object of the hologram element 82 is arranged in a position where the laser beam from the beam expander 94 and the laser beam from the pin hole plate 96 cross, and is hologram-exposed. At this time, the substrate 82a is arranged so that an angle made by the laser beam from the beam expander 94 transmitted through the substrate 82a and a normal of the substrate 82a becomes equal with an angle made by the diffracted and reflected lights L at the time of use shown in FIG. 17 and a normal of the hologram element 82.

In addition, the pin hole plate 96 is movable, and the pin hole 96a can be in three positions with respect to the substrate 82*a* which has the same positional relationship with the three light emitting diodes 81R, 81G and 81B with respect to the hologram element 82. FIGS. 19(*a*) through 19(*c*) show states that the hologram exposure is carried out. As shown in FIGS. 19(*a*) through 19(*c*), the hologram exposure is carried out three times in a manner that the position of the pin hole 96*a* is changed, and in the respective hologram exposures, one of the three laser beam sources 91R, 91G and 91B emits a laser beam with wavelength approximately equal with that of the light emitting diode corresponding to the position of the pin hole 96*a*.

The hologram element 82 obtained in such a manner has the function for diffracting and reflecting lights from the light emitting diodes 81R, 81G and 81B in one direction and mixing the colors, and the function for converting the diffracted and reflected lights into parallel light fluxes suitable for illuminating the liquid crystal display 83. The light emitting diodes 81R, 81G and 81B can be arranged near the hologram element 82, and the display device 8 can be miniaturized easily.

However, in the display device 8, since the three light emitting diodes 81R, 81G and 81B are arranged on the flat surface parallel with the diffracted and reflected lights L by means of the hologram element 82, the hologram exposing device 9 becomes complicated and large. The reason for this will be explained with reference to FIGS. 18 and 19.

At the time of the three-time hologram exposure, it is necessary to make a direction of the substrate 82*a* with respect to the laser beam from the beam expander 94 constant. Meanwhile, it is necessary to change an angle of the laser beam from the pin hole 96*a* with respect to the laser beam from the beam expander 94 at each time of the hologram exposure. Namely, it is integrant that the pin hole plate 96 is movable, and at least the mirror 95*b* of the mirrors 95*a* and 95*b* for guiding the laser beams to the pin hole plate 96 should be also movable. For this reason, a mechanism for holding the pin hole plate 96 and the mirror 95*b* so that they are movable to a direction of an arrow is unexpendable.

Furthermore, the mirror 95*b* is moved simply together with the pin hole plate 96, and also it is necessary to change the angle formed by the mirror 95*a* and the pin hole plate 96 at the time of each hologram exposure, and a mechanism for this is further necessary. When these mechanisms are provided, the hologram exposing device 9 becomes complicated and large.

In addition, in the display device 8, incident angles of the lights from the light emitting diodes 81R, 81G and 81B with respect to the hologram element 82 are different from one another, and a difference in the incident angle of the lights from the two light emitting diodes 81R and 81B positioned on both ends is large. Generally, as a difference between the incident angle and the diffracting and reflecting angle is smaller, the diffraction efficiency of the reflection type hologram element is higher, and as the incident angle is smaller, the diffraction efficiency is higher. Moreover, generally a radiation angle of a small light emitting diode is 60° in full width at half maximum, namely, wide. For this reason, in order to utilize a radiated light effectively, it is more preferable that an area of the hologram element where the light enters is larger.

Taking this into consideration, in the display device 8, the hologram element 82 is arranged so as to face between the light emitting diodes 81R, 81G, 81B and the the liquid crystal display 83. However, even with this structure, it is inevitable that the the diffraction efficiencies of the lights from the light emitting diodes 81R and 81B differ, and the diffraction efficiency of the light from the light emitting diode 81B which is the farthest from the liquid crystal display 83 is easily lowered. An output of the light emitting diode 81B is heightened relatively, so that an image with suitable color can be provided. However, the lowering of the diffraction efficiency is not preferable from the viewpoint of the effective use of lights.

Further, when the light emitting diodes 81R, 81G and 81B are arranged on the flat surface parallel with the diffracted and reflected lights L of the hologram element 82, there arises problem that a structural dimension becomes large.

SUMMARY OF THE INVENTION

It is an object of the present invention to provide an improved display device.

It is another object of the present invention to provide a display device having a reflection type hologram element for illuminating an image display element, and to realize a small structure in which the hologram element is easily manufactured and diffraction efficiencies of the hologram element for lights with different wavelengths are easily made to be equivalent to one another.

In order to achieve the above object, the present invention includes: a plurality of light emitting elements for emitting lights; a display element for modulating the light emitting from the plurality of light emitting elements so as to convert it to an image light showing an optical image; a reflection type hologram element, having a positive optical power with respect to the lights from the plural light emitting elements, for diffracting and reflecting the lights from the plural light emitting elements to approximately one direction so as to guide the diffracted and reflected lights to the display element; and an enlarging optical system for forming an enlarged image of the optical image converted by the lights from the image display element, the plural light emitting elements are positioned in a plane approximately vertical to an optical path of the lights diffracted and reflected by the hologram element, and the hologram element is tilted to a direction facing the plural light emitting elements with respect to the optical path of the lights diffracted and reflected by the hologram element.

BRIEF DESCRIPTION OF THE DRAWINGS

This and other objects and features of this invention will become apparent from the following description, taken in conjunction with the preferred embodiments with reference to accompanied drawings in which.

DESCRIPTION OF THE PREFERRED EMBODIMENT

Figure 1:
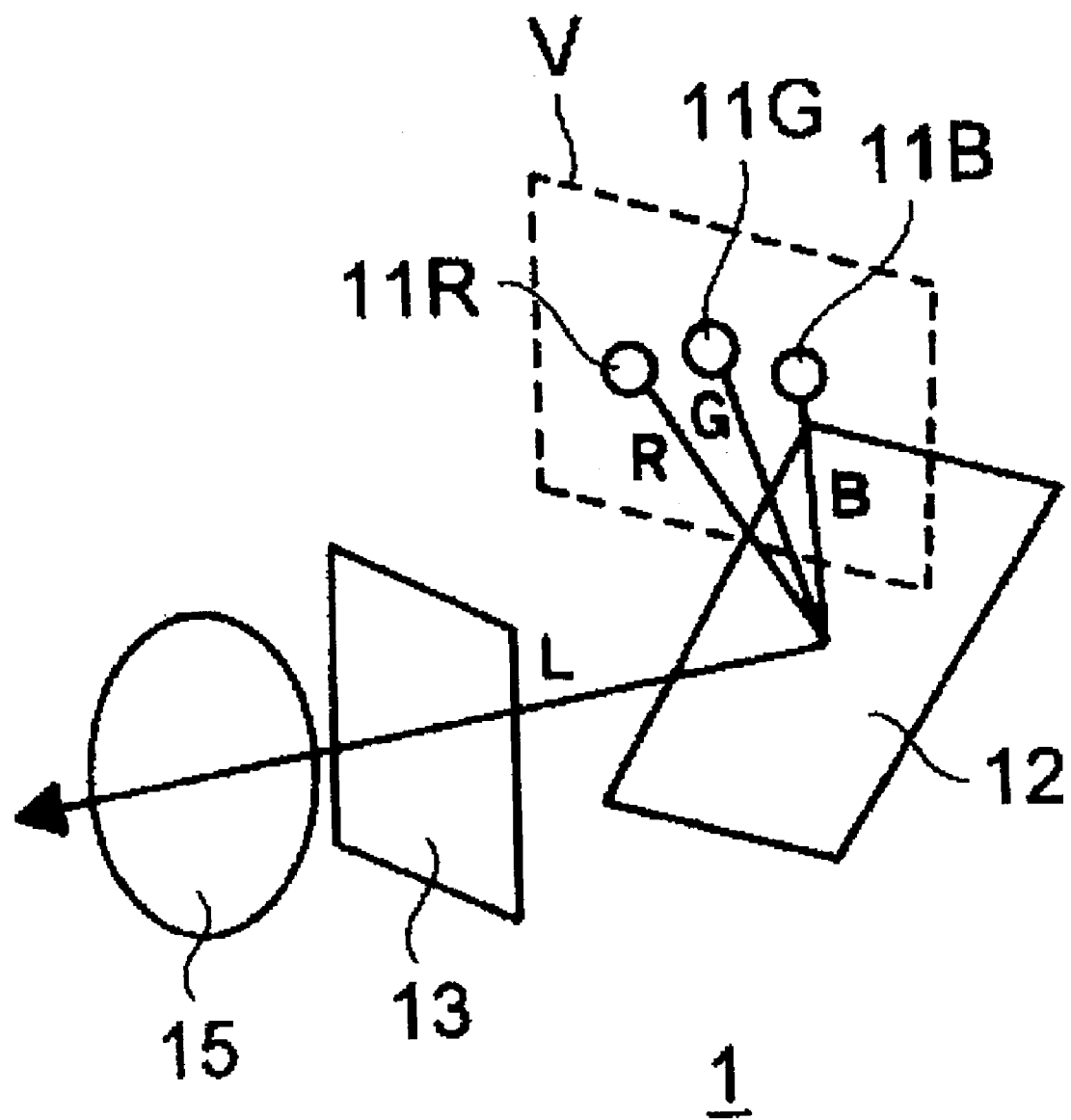
FIG. 1 is a perspective view schematically showing an optical structure of a display device according to a first embodiment.
Figure 2:
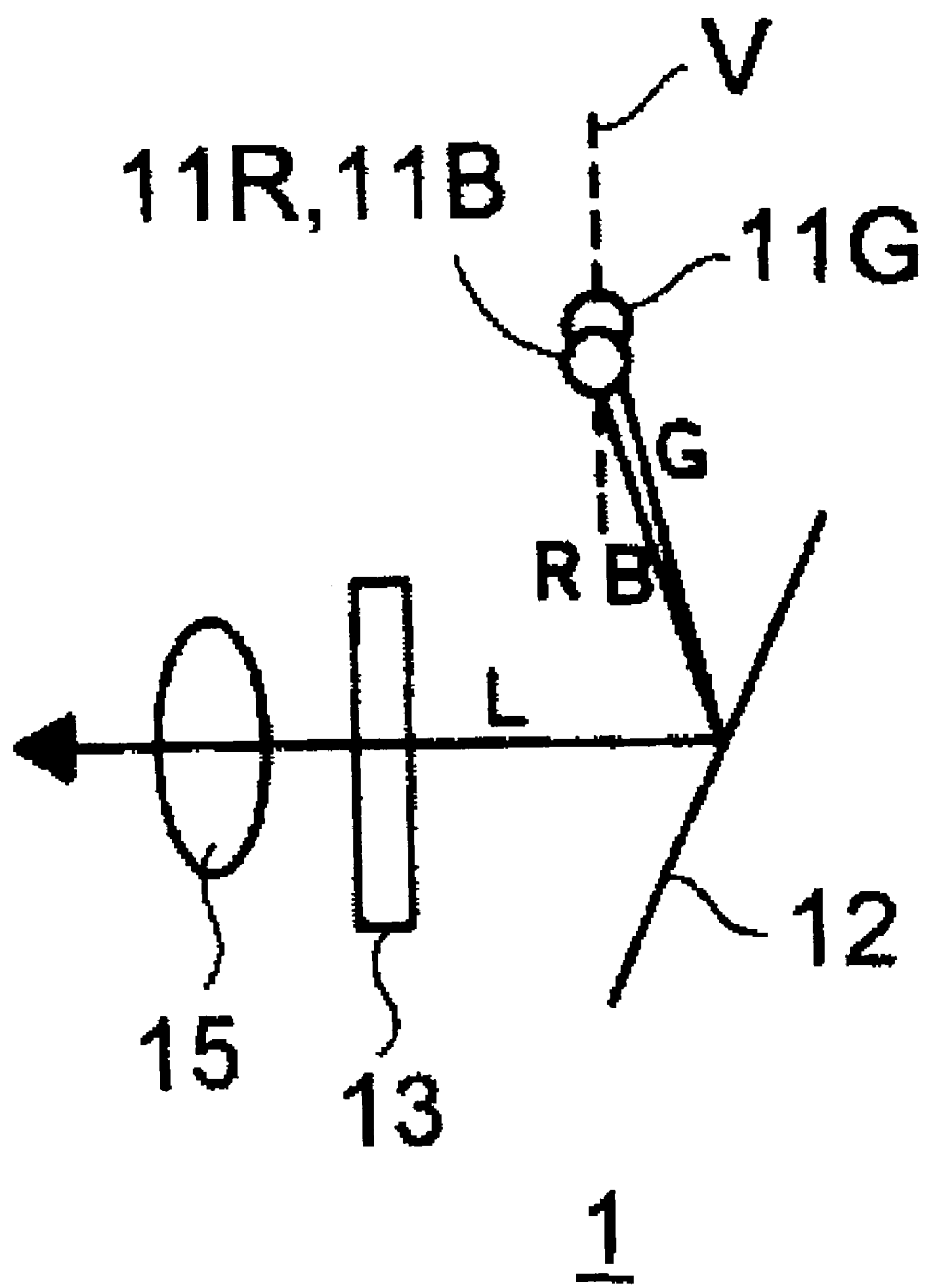
FIG. 2 is a side view schematically showing the optical structure of the display device according to the first embodiment.

There will be explained below a display device according to embodiments of the present invention with reference to the drawings. An optical structure of a display device 1 according to a first embodiment is schematically shown in the perspective view of FIG. 1 and the side view of FIG. 2. The display device 1 is composed of three light emitting diodes 11R, 11G and 11B, a reflection type hologram element 12, a transmission type liquid crystal display 13 and an eyepiece optical system 15. The light emitting diodes 11R, 11G and 11B emit an R light, a G light and a B light, respectively. The lights emitted from the light emitting diodes 11R, 11G and 11B become a divergent pencil of lights, but FIGS. 1 and 2 show only a principal light of each light flux.

The reflection type hologram element 12 diffracts and reflect lights from the three light emitting diodes 11R, 11G and 11B so as to guide the diffracted and reflected lights to the liquid crystal display 13. The light emitting diodes 11R, 11G and 11B are arranged so as to face one point on the hologram element 12, and principal lights of the lights from the light emitting diodes enter one point on the hologram element 12 at different angles. The hologram element 12 diffracts and reflects the lights from the three light emitting diodes 11R, 11G and 11B which enter at different angles to one direction, and converts the respective diffracted and reflected lights into parallel light fluxes.

The transmission type liquid crystal display 13 is arranged vertically to optical paths of the diffracted and reflected lights L by means of the hologram element 12, and has a liquid crystal layer for displaying an image according to an image signal and two polarizing plates provided on both surfaces of the liquid crystal layer (not shown). The liquid crystal display 13 converts the lights from the light emitting diodes 11R, 11G and 11B guided by the hologram element 12 into linear polarized lights using the polarizing plate on the incident side, and modulates the linear polarized lights using the liquid crystal layer so as to convert them into two linear polarized lights, polarizing direction of which intersect perpendicularly to each other. One of the two linear polarized lights is allowed to transmit through the polarizing plate on the emitting side so as to be a light showing an image. Generally since the diffraction efficiency of an S polarized light on the reflection type hologram element is high, it is desirable that the direction of the polarizing plate of the liquid crystal display 13 is set in order to use an S polarized component of the lights diffracted by the hologram element 12 for displaying an image.

The eyepiece optical system 15 forms an enlarged virtual image of an image shown by the light from the liquid crystal display 13 so as to provide it to a user. The light emitting diodes 11R, 11G and 11B emit lights in a manner that time is shifted, and R light, G light and B alight are guided to the liquid crystal display 13 at different time. Moreover, a color filter is not provided to each pixel of the liquid crystal display 13, and all the pixels become display elements of an R component, a G component and a B component of the color image. The light emission of the light emitting diodes 11R, 11G and 11B and display of the respective color components of the liquid crystal display 13 are repeated synchronously, thereby providing a color image to a user.

The three light emitting diodes 11R, 11G and 11B are arranged on a flat surface V vertical to the optical paths of the diffracted and reflected lights L by means of the hologram element 12 at uniform distance from central axes (principal light) of the diffracted and reflected lights L with equal intervals. Here, the three light emitting diodes 11R, 11G and 11B are arranged so that the light emitting diode 11G for emitting G light comes to the center, but their arranging order is arbitrary.

Angles made by the principal light of the light directing to the hologram element 12 and the diffracted and reflected lights L by means of the hologram element 12 are equal with one another as for the three light emitting diodes 11R, 11G and 11B. Therefore, the lights from the light emitting diodes 11R, 11G and 11B are diffracted and reflected with high diffraction efficiency, and there is barely difference in their diffraction efficiencies. For this reason, the lights from the light emitting diodes 11R, 11G and 11B are utilized efficiently for illuminating the liquid crystal display 13, and it is not necessary for optimize color shade of the color image to be provided to adjust output intensity of the light emitting diodes 11R, 11G and 11B taking the diffraction efficiency into consideration.

Figure 3:
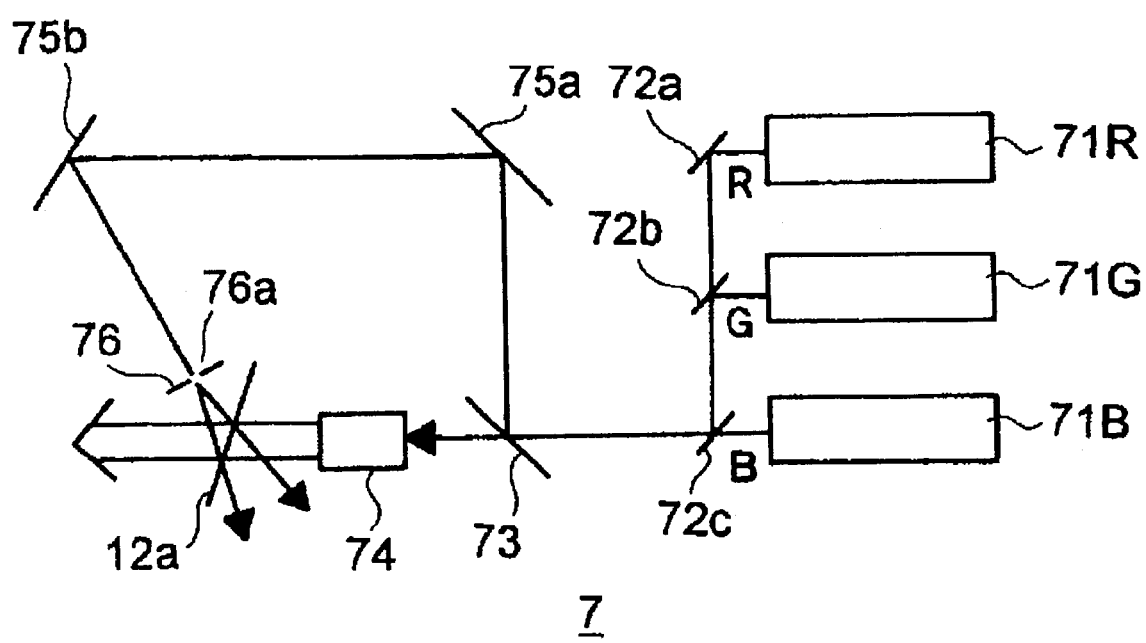
FIG. 3 is a side view schematically shows a structure of a hologram exposing device to be used for manufacturing a reflection type hologram element provided to the display device according to embodiments.

FIG. 3 schematically shows a structure of the hologram exposing device 7 to be used for manufacturing the reflection type hologram element 12. This device 7 is composed of three laser beam sources 71R, 71G and 71B, three mirrors 72a, 72b and 72c, a beam splitter 73, a beam expander 74, two mirrors 75a and 75b and a pin hole plate 76 provided with a pin hole 76a. The laser beam sources 71R, 71G and 71B emit laser beams with wavelengths approximately equal with the wavelengths of the lights emitted from the light emitting diodes 11R, 11G and 11B. The mirror 72a reflects a laser beam from the beam source 71R, and the mirror 72b reflects a laser beam from the beam source 71G and allows the laser beam from the mirror 72a to transmit, and the mirror 72c allows a laser beam from the beam source 71B to transmit and reflects the laser beam from the mirror 72b.

The laser beams from the laser beam sources 71R, 71G and 71B advance to one direction via the mirrors 72a, 72b and 72c. Here, the arranging order of the laser beam sources 71G, 71G and 71B is arbitrary, and the transmission and reflection of the mirrors 72a, 72b and 72c may be set freely as long as the laser beams from the beam sources 71R, 72G and 72B are allowed to advance to one direction.

The beam splitter 73 branches the laser beam from the mirror 72c into a transmitted light and a reflected light, and the beam expander 74 expandes a light flux diameter of the laser beam transmitted through the beam splitter 73. The mirror 75a reflects the laser beam reflected by the beam splitter 73, and the mirror 75b further reflects the laser beam from the mirror 75a so as to allow it to cross the laser beam transmitted through the beam expander 74. The pin hole plate 76 allows the laser beam from the mirror 75b through the pin hole 76a so as to convert it into a divergent pencil of lights.

The beam expander 74 converts a laser beam into a parallel light having a certain diameter, but may convert a laser beam into a converged light or a divergent light having a certain diameter according to an optical system which is combined with the beam expander 74 at the time of hologram reproduction. Moreover, instead of the pin hole plate 76, a lens or a combination of the pin hole plate and a lens may be used.

The substrate 12a coated with the hologram sensitizer, namely, the original object of the hologram element 12 is arranged in a position where a laser beam from the beam expander 74 and a laser beam from the pin hole 76a cross and is hologram-exposed. At this time, the substrate 12a is arranged so that an angle made by the laser beam from the beam expander 74 after transmitting through the substrate 12a and a normal of the substrate 12a becomes equal with an angle made by the diffracted and reflected lights L at the time of use shown in FIGS. 1 and 2 and the normal of the hologram element 12.

Figure 4A:
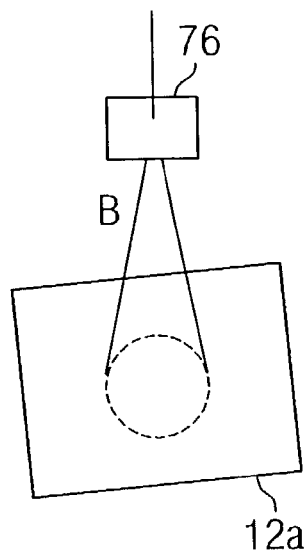
FIGS. 4(*a*) through 4(*c*) are front views schematically showing a state that hologram exposure is carried out by the hologram exposing device in FIG. 3.
Figure 4B:
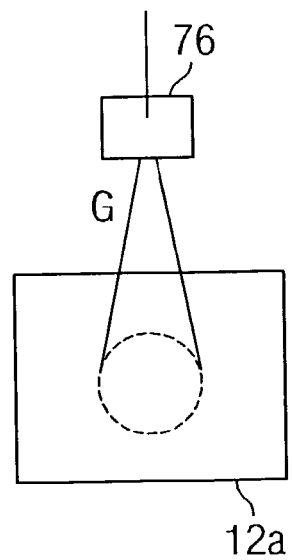
Figure 4C:
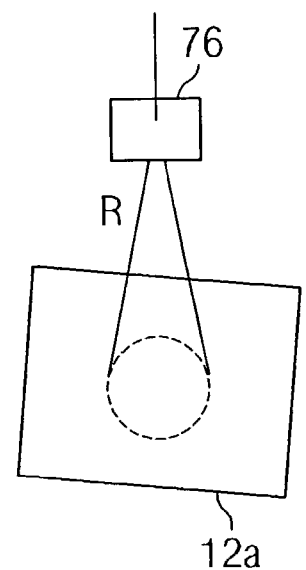

The pin hole plate 76 is fixed, and the light from the pin hole 76a always forms a constant angle with respect to the light transmitted through the beam expander 74. The position of the pin hole 76a is the same as the position of the center light emitting diode 11G at the time of use. Meanwhile, the substrate 12a is held movably about a central axis (principal light) of the light transmitted through the beam expander 74. FIG. 4 shows the state that the hologram exposure is carried out. FIGS. 4(a) through 4(c) are front views viewed from a direction of the light transmitted through the beam expander 74. The hologram exposure is carried out three times by pivoting the substrate 12a about the principal light of the light from the beam expander 74 as shown in FIGS. 4(a) through 4(c), and in each hologram exposure one of the three laser beam sources 71R, 71G and 71B is allowed to emit a laser beam with wavelength approximately equal with the wavelength of the light emitting diode corresponding to the direction of the substrate 12a.

The hologram exposing device 7 may have only a mechanism for holding the substrate 12a rotatively, and a mechanism for holding the pin hole plate 76 and the mirror 75b movably is no necessary at all, and thus the structure is extremely simple. Moreover, in the each hologram exposure, only a pivoting angle of the substrate 12a may be set strictly, and control of the device 7 is easy.

As the hologram sensitizer applied to the substrate 12a, a single sensitizer having sensibility for all wavelengths of the laser beams emitted from the beam sources 71R, 71G and 71B is used, or two or more sensitizers having sensibility for one of wavelengths of the laser beams emitted from the beam sources 71R, 71G and 71B can be combined. In both cases, a hologram sensitizer having high absorptance (sensibility) for the wavelengths of the laser beams emitted from the beam sources 71R, 71G and 71B is used so that the lights from the light emitting diodes 11R, 11G and 11B can be diffracted and reflected the most efficiently.

As the hologram sensitizer, silver salt, heavy chromium gelatin or the like may be used, but photopolymer which can be used at the dry process is the most preferable. Moreover, instead of coating, a sheet coated with sensitizer may be laminated on a substrate. Any substrate can be used as long as a laser beam to be used for exposure is transmitted therethrough. Moreover, in order to reduce a noise light at the time of exposure, it is desirable that the substrate is coated with an antireflection film.

Figure 5:
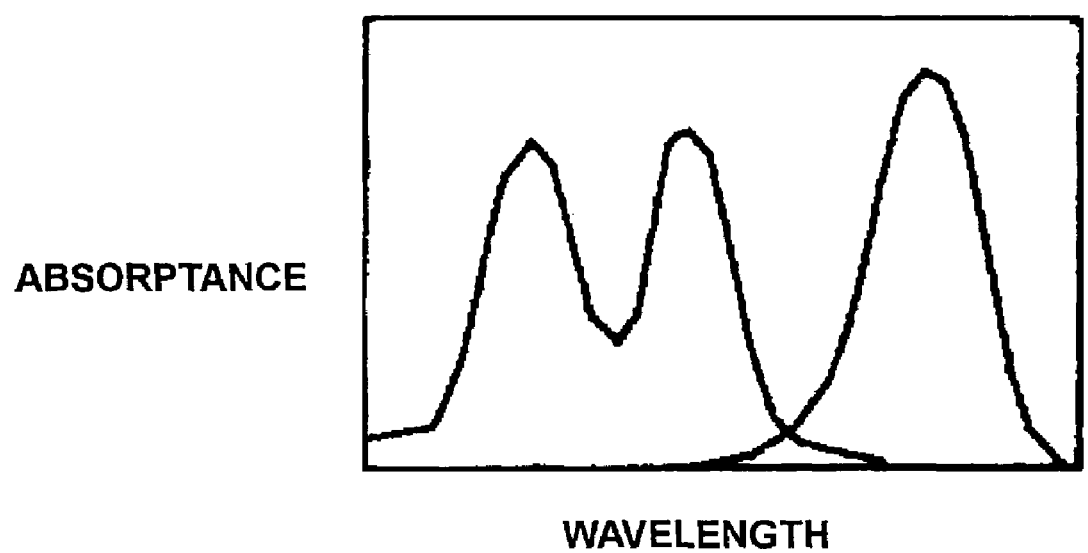
FIG. 5 is a diagram schematically showing an example of a relationship between a wavelength of an exposure-use laser beam and absorptance of a hologram sensitizer when two kinds of hologram sensitizers.
Figure 6:
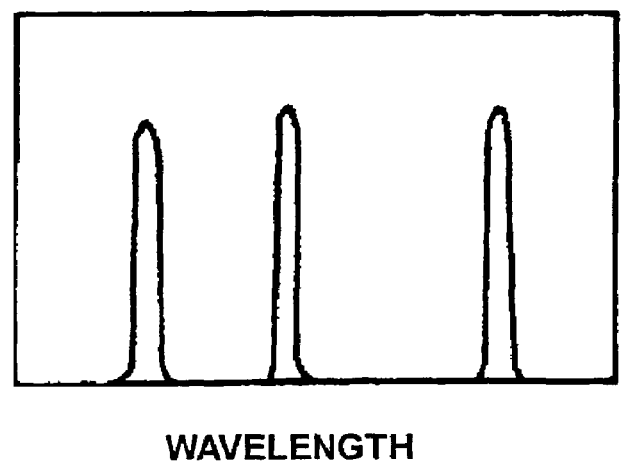
FIG. 6 is a diagram schematically showing a relationship between the wavelength and the diffraction efficiency on the hologram element manufactured in the relationship of FIG. 5.
Figure 7:
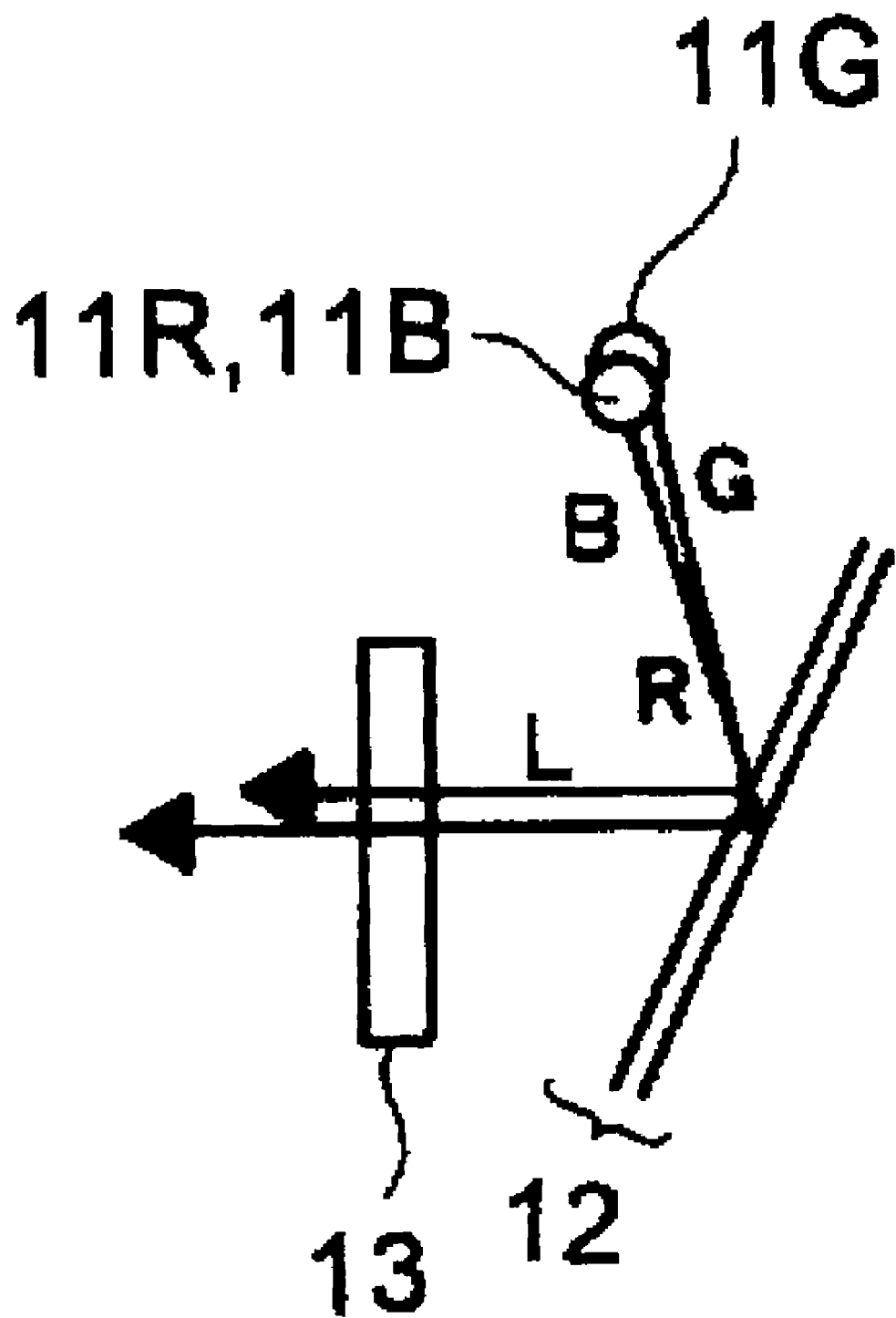
FIG. 7 is a side view schematically showing an example of a structure of the hologram element manufactured by using two kinds of hologram sensitizers.

FIG. 5 shows a relationship between the wavelengths of the laser beams and the absorptance of the respective sensitizers when the hologram element 12 is manufactured by using a sensitizer having sensibility for R light and a sensitizer having sensibility for G light and B light. FIG. 6 shows a relationship between the wavelengths and the diffraction efficiency on the hologram element 12 obtained in such a manner The obtained hologram element 12 has a two-layered structure shown in FIG. 7, for example.

Figure 8A:
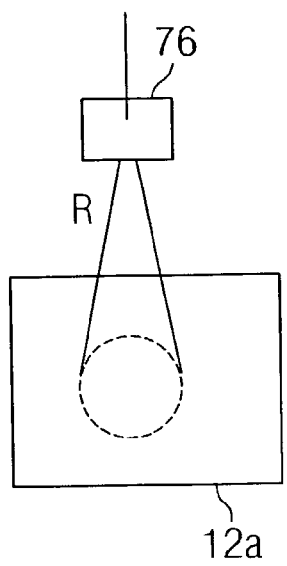
FIGS. 8(a) through 8(c) are front views schematically showing states that the hologram exposure is carried out by the hologram exposing device in FIG. 3 according to another method.
Figure 8B:
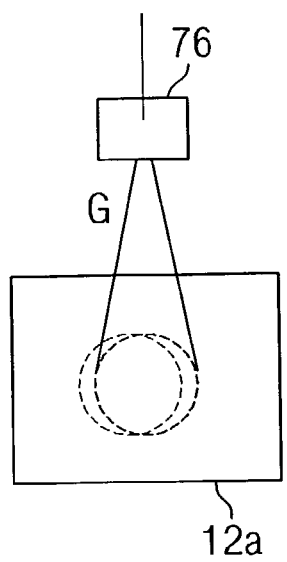
Figure 8C:
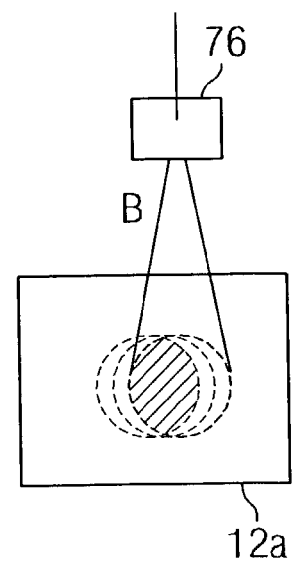

The hologram element 12 can be manufactured by the above method of pivoting the substrate 12a and also a method of moving the substrate 12a parallel. FIG. 8 shows a state that the hologram exposure is carried out by this method. FIG. 8 is a front view viewed from the direction of the light transmitted through the beam expander 74. The hologram exposure is carried out three times in such a manner that the substrate 12a is moved to the vertical direction to the principal light of the light from the beam expander 74 (direction where the light emitting diodes 11R and 11B on both ends are connected) by a distance equal with the arranging interval of the light emitting diodes 11R, 11U and 11B as shown in FIGS. 8(a) through 8(c). In each hologram exposure, one of the three laser beam sources 71R, 71G and 71B is allowed to emit a laser beam with wavelength approximately equal with that of the light emitting diode corresponding to the position of the substrate 12a.

A portion of the substrate 12a which has been subject to the hologram exposure three times (shaded portion in FIG. 8(c)) becomes an area where the lights from the three light emitting diodes 11R, 11G and 11B are diffracted and reflected to one direction, and the diffracted and reflected lights on this portion are used for illuminating the liquid crystal display 13. Also in this method, the hologram exposing device 7 may include only a mechanism for holding the substrate 12a movably to one direction, and a mechanism for holding the pin hole plate 76 and the mirror 75b movably is not necessary completely, so that the structure becomes extremely simple. Moreover, in each hologram exposure, only a moving distance of the substrate 12a may be set precisely, and the control of the device 7 is easily.

Here, in the case where the hologram element 12 manufactured in this method is used, the directions of the light emitting diodes 11R, 11G and 11B are set so that principal lights are parallel with one another. This is because the diffraction efficiency of the lights from the light emitting diodes 11R, 11G and 11B are maximum. The method of pivoting the substrate 12a so as to execute the hologram exposure is superior from the viewpoint of the use efficiency of a light, but the method of moving the substrate 12a parallel so as to execute the hologram exposure is superior from the viewpoint of easiness of the provision of the light emitting diodes 11R, 11G and 11B.

Figure 9:
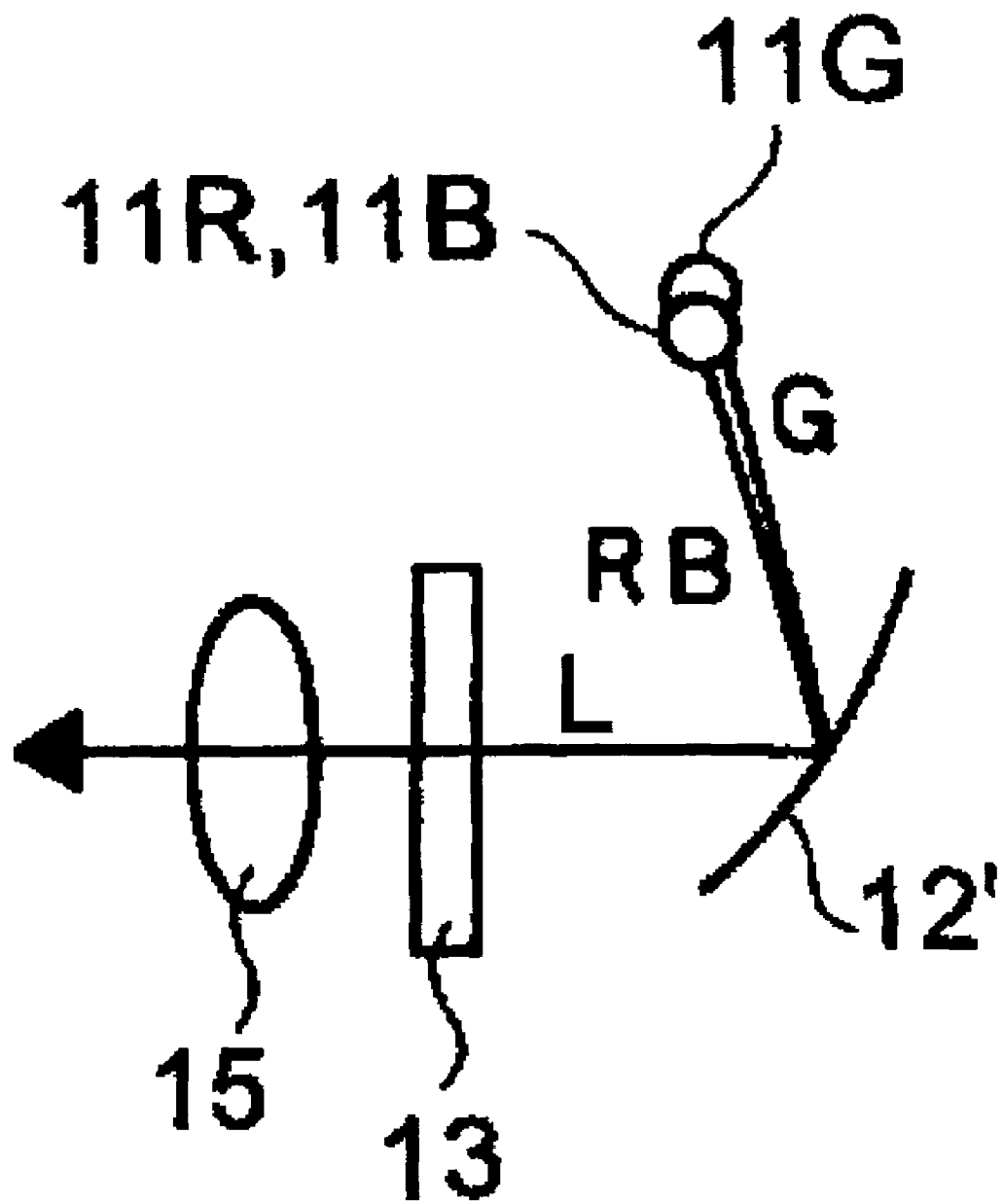
FIG. 9 is a side view schematically showing an optical structure of a modified example of the display device according to an embodiment.

In the display device 1, the hologram element 12 is a flat surface, but the hologram element can be a curved surface. One example is shown in a side view of FIG. 9. In FIG. 9, the display device 1 is provided with a hologram element 12' where the side of the light emitting diodes 11R, 11G and 11B is a concavity. Since the lights from the light emitting diodes 11R, 11G and 11B are divergent pencils of lights, there is a difference in the incident angle to the hologram element 12 with flat surface for each portion of the light flux. However, when such a hologram element 12' having concavity is used, a difference in the incident angle can be small, and thus the diffraction efficiency can be further heightened. The hologram element 12' with curved surface is manufactured by using a substrate with curved surface coated with a hologram sensitizer according to the method shown in FIG. 4 or 8.

Figure 10:
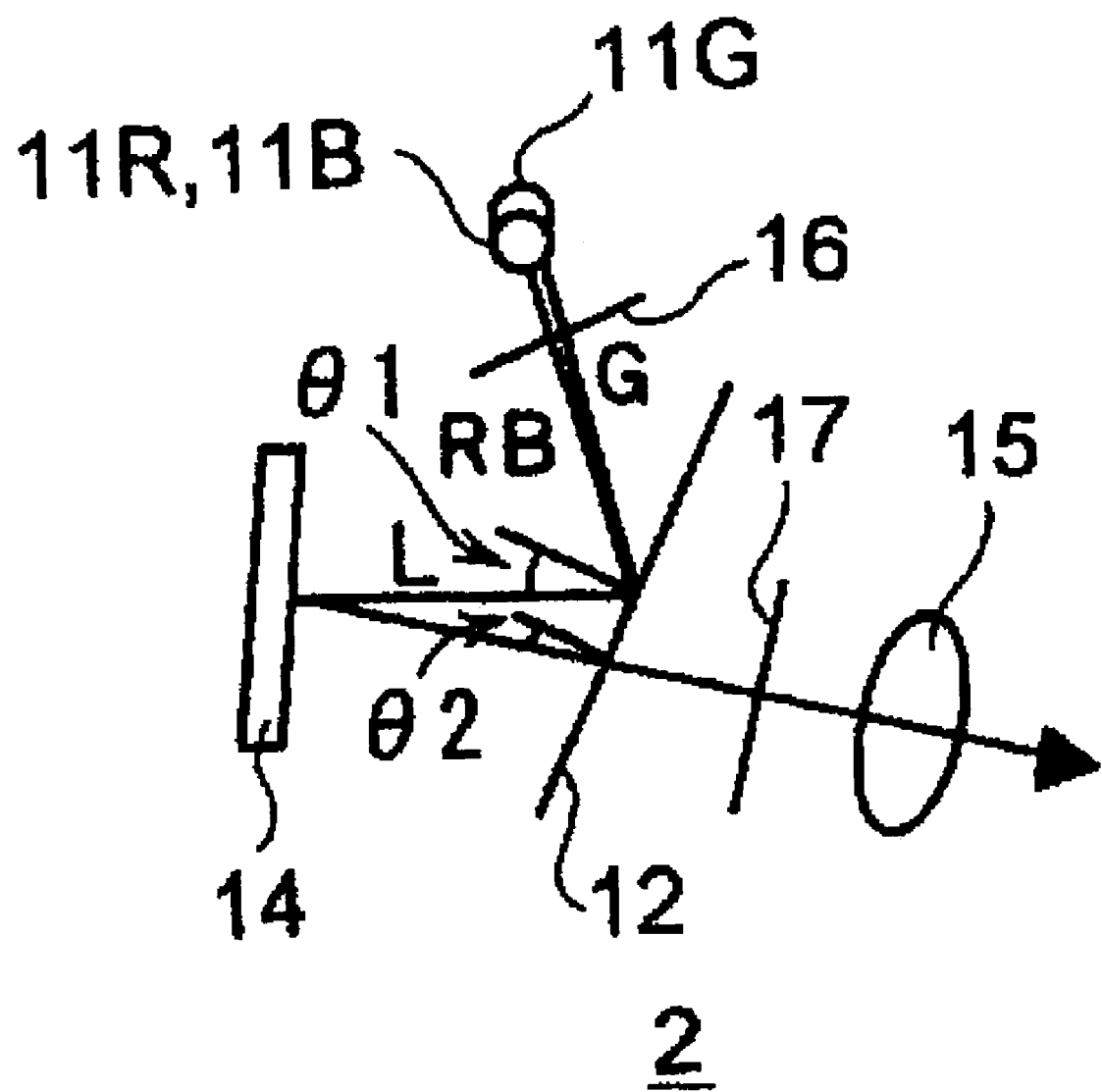
FIG. 10 is a side view schematically showing an optical structure of the display device according to a second embodiment.

The optical structure of a display device 2 according to a second embodiment is shown in a side view of FIG. 10. The display device 2 is constituted so that the display device 1 of the first embodiment is modified and a reflection type liquid crystal display 14 is provided instead of the transmission type liquid crystal display 13. The display device 1 is constituted so that the transmission type liquid crystal display 13 contains the two polarizing plates, but the display device 2 is constituted so that corresponding polarizing plates 16 and 17 are separated from the the liquid crystal display 14 and are provided between the light emitting diodes 11R, 11G, 11B and the hologram element 12 and between the hologram element 12 and the eyepiece optical system 15, respectively.

The lights from the light emitting diodes 11R, 11G and 11B are converted into linear polarized lights by the polarizing plate 16 and are diffracted and reflected by the reflection type hologram element 12 so as to be guided to the liquid crystal display 14. The liquid crystal display 14 has a reflecting plate (not shown) on the opposite side of the liquid crystal layer to the hologram element 12, and while transmitting through the liquid crystal layer twice before and after reflection by means of the reflecting plate, the guided lights are modulated. The lights which have been reflected and modulated by the liquid crystal display 14 transmit through the hologram element 12 and converted into only image lights by the polarizing plate 17 so that the image lights enter the eyepiece optical system 15.

The positions and directions of the light emitting diodes 11R, 11G and 11B with respect to the reflection type hologram element 12, and a condition of diffraction and reflection of the hologram element 12 with respect to the lights from the light emitting diodes 11R 11G and 11B are set similarly to the display device 1. However, the liquid crystal display 14 is provided to be slightly tilted with respect to the diffracted and reflected lights by means of the hologram element 12. Therefore, the liquid crystal display 14 reflects the lights from the hologram element 12 to a direction with a difference in an angle with respect to the incident direction, and the lights from the liquid crystal display 14 enter the hologram element 12 from a direction different from the diffracted and reflected lights L. In FIG. 10, an angle of the diffracted and reflected lights L with respect to the hologram element 12 is $\theta1$, and an incident angle of the light from the liquid crystal display 14 with respect to the hologram element 12 is $\theta2$. $\theta1 > \theta2$.

Generally the reflection type hologram element has high incident angle selectivity, and the lights, which enter from the direction having a certain angle difference with respect to the diffracted and reflected direction, can be transmitted almost completely without diffraction and reflection even if the lights have the same wavelength. In the display device 2 which utilizes such a characteristic of the reflection type hologram element, the lights from the light emitting diodes 11R 11G and 11B are diffracted and reflected by the hologram element 12 so as to be guided to the liquid crystal display 14, and simultaneously the light from the liquid crystal display 14 transmits through the hologram element 12 so as to be guided to the eyepiece optical system 15.

Figure 11:
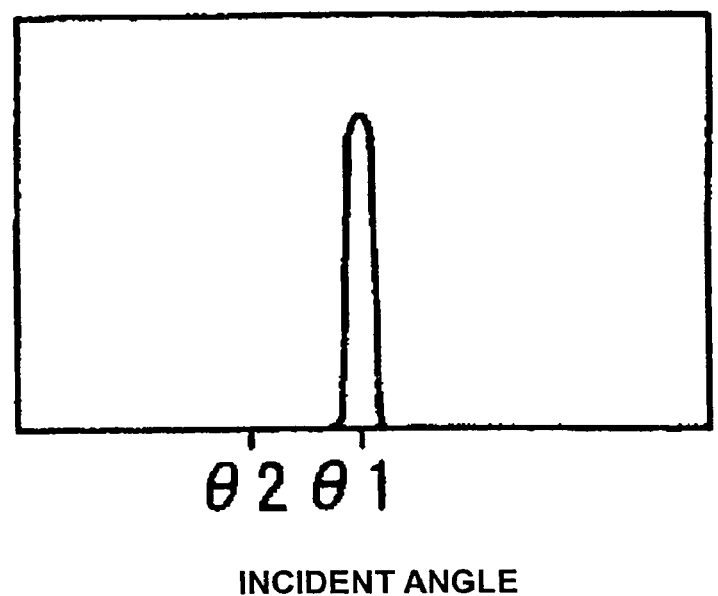
FIG. 11 is a diagram schematically showing a relationship between an incident angle and diffraction and reflection efficiency in the hologram element provided to the display device according to the second embodiment.

A relationship between the incident angle and the diffraction and reflection efficiency on the hologram element 12 of the display device 2 is schematically shown in FIG. 11. The direction of the hologram element 12 with respect to the light emitting diodes 11R, 11G and 11B and the liquid crystal display 14 is set so that the diffraction efficiency becomes maximum in the vicinity of the incident angle $\theta1$ of the lights from the light emitting diodes 11R, 11G and 11B, and the diffraction efficiency becomes approximately 0 at the incident angle $\theta2$ of the light from the liquid crystal display 14.

Since a light to be modulated passes through the liquid crystal layer twice in a reciprocatory way in the reflection type liquid crystal display, the thickness of the liquid crystal layer becomes about half of that of the transmission type liquid crystal display, so that the state of the liquid crystal layer can be switched at high speed. Moreover, a thin film transistor for controlling switching of the state of the liquid crystal layer can be provided on the reflecting plate side, and unlike the transmission type liquid crystal display in which a transistor for control should be provided around an aperture, an aperture ratio of each pixel is not lowered. Therefore, in the display device 2 using the reflection type liquid crystal display 14, an image to be displayed can be switched quickly, and a bright image can be provided.

Figure 12:
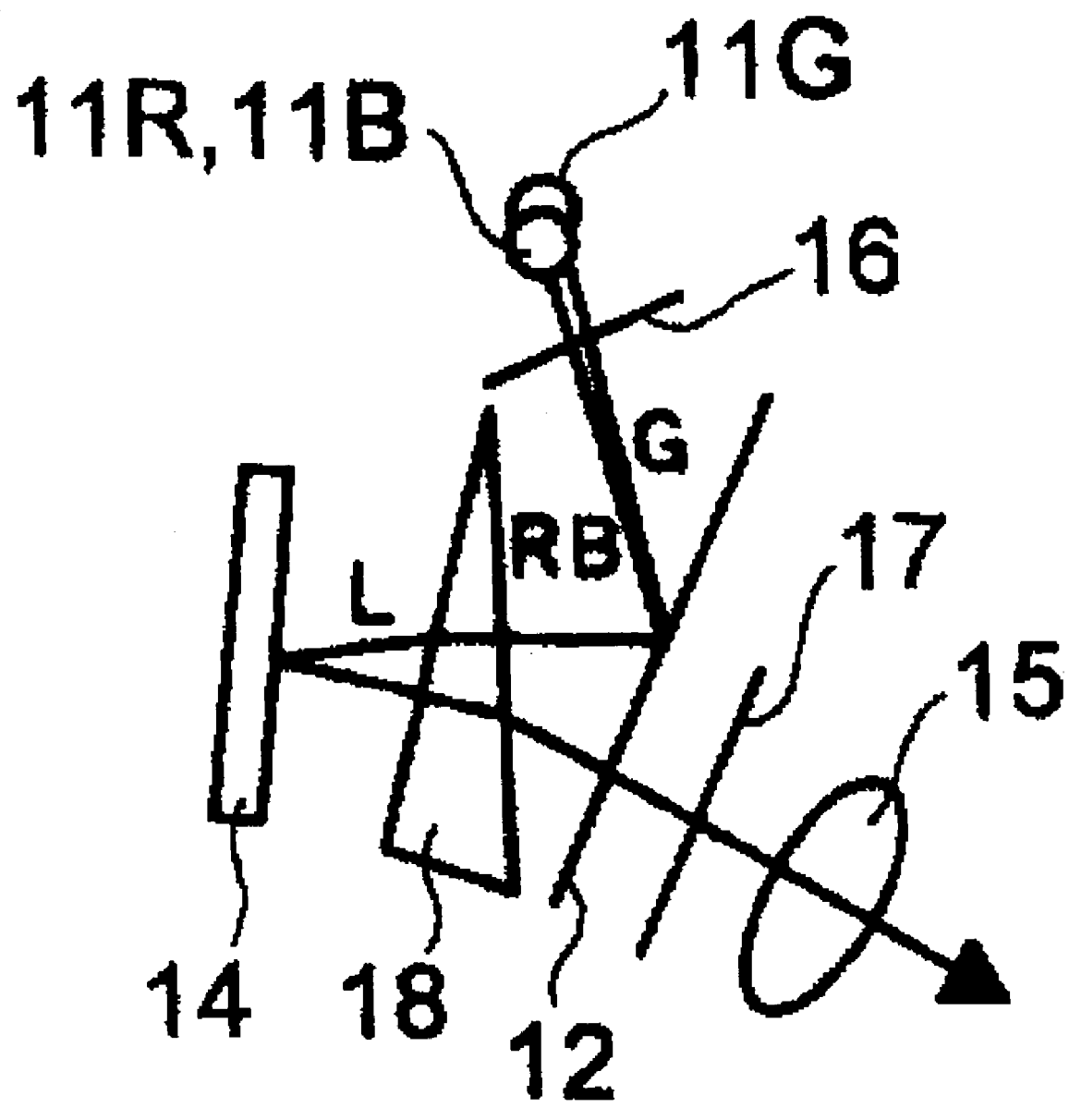
FIG. 12 is a side view schematically showing an optical structure of the display device according to a third embodiment.

The optical system of a display device 3 according to a third embodiment is shown in a side view of FIG. 12. The display device 3 is constituted so that the display device 2 of the second embodiment is modified and a prism 18 is provided between the hologram element 12 and the liquid crystal display 14. The prism 18 becomes thinner as it is closer to the light emitting diodes 11R, 11G and 11B, namely, it has a wedge shape, and a larger difference in angle is given to the diffracted and reflected lights L by means of the hologram element 12 and an image light from the liquid crystal display 14.

Generally as the incident angle of a light becomes larger, an amount of a transmitted light or a reflected light is reduced in the liquid crystal display, and the contrast of a display image is also lowered, but the prism 18 increases a difference in angle between the diffracted and reflected lights of the hologram element 12 and the light from the liquid crystal display 14, so that the incident angle of the light from the liquid crystal display 14 can be small and a brighter image can be provided.

Here, in the display devices 2 and 3 according to the second and third embodiments, the lights from the three light emitting diodes 11R, 11G and 11B are guided to the liquid crystal display 14 at different time. However, the following technique can be applied also to the display device which has a single light source for emitting lights with wide wavelength range (for example, wavelength over a white light) and modulates the lights with this wavelength range simultaneously using an image display element (for example, liquid crystal display provided in which a color filter is provided for each pixel). Such a technique is that the incident angle selectivity of the reflection type hologram element is utilized so that the lights from the light sources are diffracted and reflected to be guided to the image display element, and the light from the image display element is transmitted without diffraction and reflection.

Figure 13:
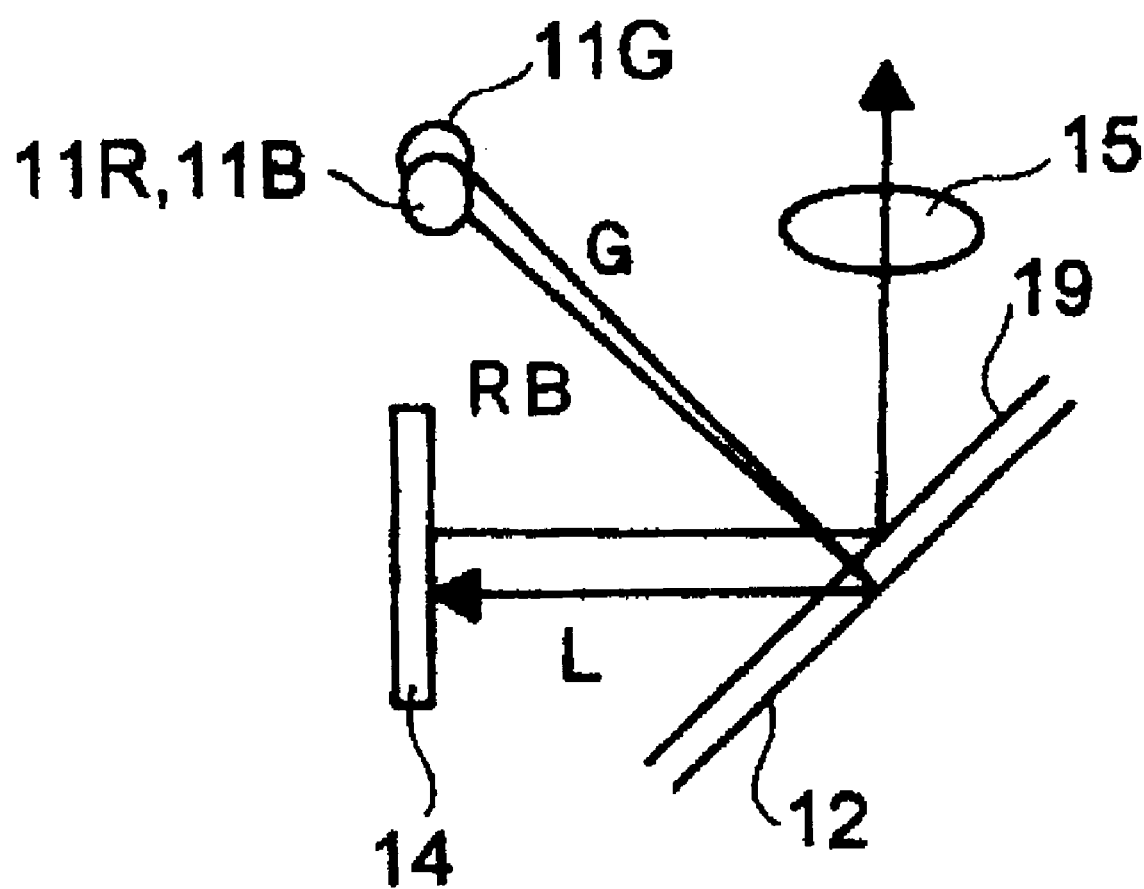
FIG. 13 is a side view schematically showing an optical structure of the display device according to a fourth embodiment.

The optical structure of a display device 4 according to a fourth embodiment is shown in a side view of FIG. 13. The display device 4 is constituted so that the display device 2 according to the second embodiment is modified and a polarization selecting element 19 is provided instead of the two polarizing plates 16 and 17. The polarization selecting element 19 is provided so as to be close to the reflection type hologram element 12 and is positioned among the light emitting diodes 11R, 11G and 11B and the liquid crystal display 14 and the hologram element 12. The polarization selecting element 19 has a characteristic which allows one of the two linear polarized lights with crossing polarizing surfaces intersecting perpendicularly to each other to transmit and reflects the other light. As such a polarization selecting element 19, for example, DBEF (Dual Brightness Enhancement Film made by 3M) is used.

The hologram element 12 is provided so as to face the three light emitting diodes 11R, 11G and 11B, and more concretely it is provided so that a principal beam of the light from the center light emitting diode 11G enter vertically. The eyepiece optical system 15 is provided on the side of the light emitting diodes 11R, 11G and 11B and the liquid crystal display 14 with respect to the hologram element 12 differently from the display device 2. Moreover, the liquid crystal display 14 is provided vertically to the diffracted and reflected lights L from the hologram element 12.

The lights from the light emitting diodes 11R, 11G and 11B enter the polarization selecting element 19 so as to be separated into a linear polarized light transmitting therethrough and a linear polarized light to be reflected. The linear polarized light reflected by the polarization selecting element 19 directs to the light emitting diodes 11R, 11G and 11B and does not enter the liquid crystal display 14 so as to be discarded. The linear polarized light which has transmitted through the polarization selecting element 19 is diffracted and reflected by the hologram element 12 and transmits through the polarization selecting element 19 entirely so as to enter the liquid crystal display 14.

The light which has entered the liquid crystal display 14 is reflected and modulated, so as to be a linear polarized light to transmit through the polarization selecting element 19 and a linear polarized light to be reflected by the polarization selecting element 19. The light from the liquid crystal display 14 again enters the polarization selecting element 19 and is separated into a linear polarized light to transmit and a linear polarized light to be reflected. The linear polarized light reflected by the polarization selecting element 19 is guided as a light showing an image to the eyepiece optical system 15. The linear polarized light which has transmitted thorough the polarization selecting element 19 is diffracted and reflected by the hologram element 12 and again transmits through the polarization selecting element 19 and directs to the light emitting diodes 11R, 11G and 11B so as to be discarded.

The display device 4 has a simple structure than that of the display device 2 having the two polarizing plates 16 and 17 so as to be further miniaturized.

Figure 14:
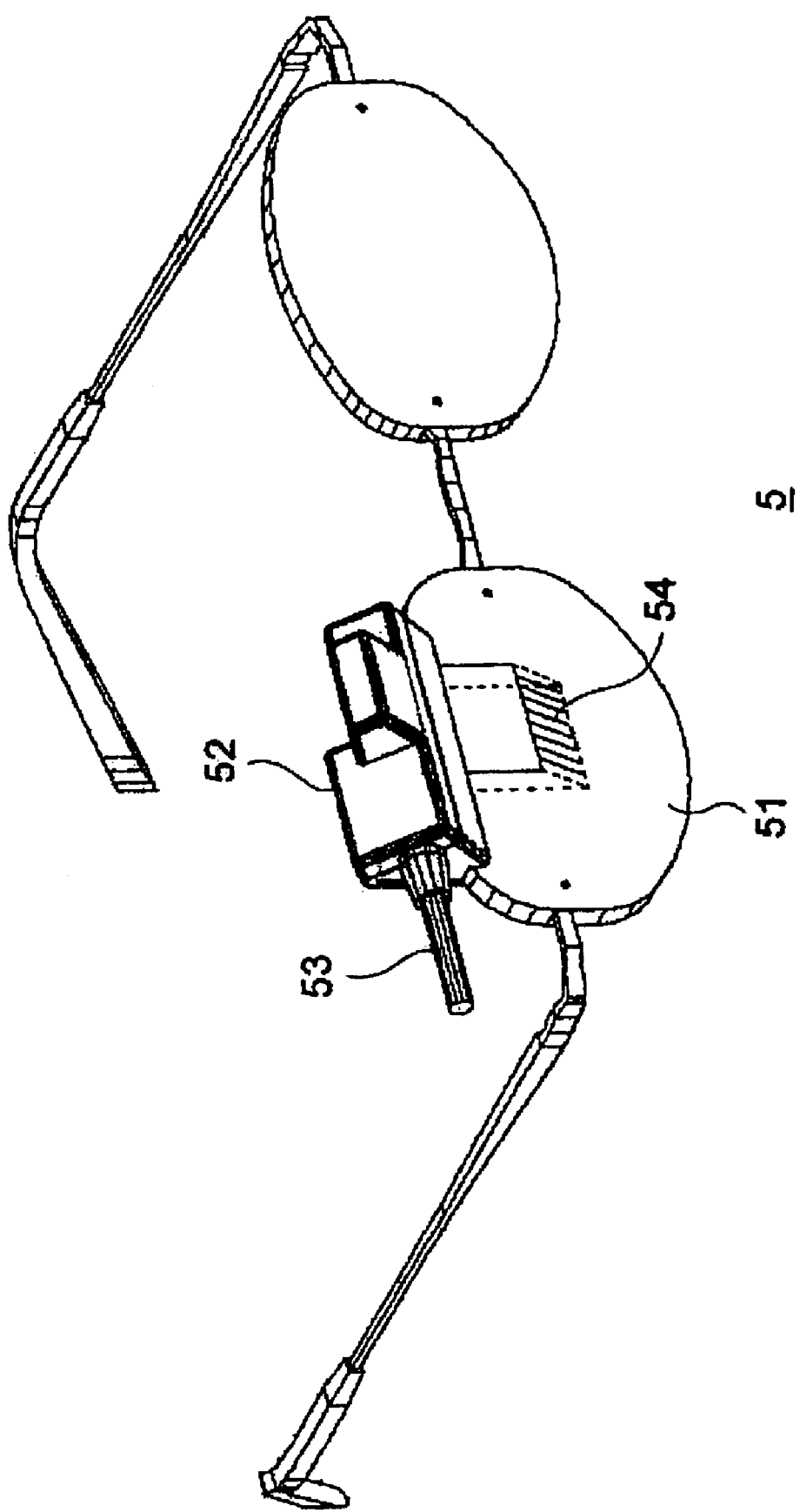
FIG. 14 is a perspective view showing an appearance of the display device according to a fifth embodiment.

The display devices 1 through 4 according to the embodiments have the eyepiece optical system 15 and this system 15 is used before eyes but since it is small, it is suitable for a hand-held type and a head portion attachment type. FIG. 14 shows an appearance of a display system 5 according to a fifth embodiment in which the display devices 1 through 4 are of eyeglass head portion attachment type. A frame 52 which houses the light emitting diodes 11R, 11G and 11B, the hologram element 12 and the like are mounted to an upper edge of a transparent plate 51 corresponding to a spectacle lens, and the eyepiece optical system 15 is provided to a center of the transparent plate 51. Moreover, the frame 52 is connected with a cable 53 for giving an image signal, a control signal and the like from a controller, not shown.

Figure 15:
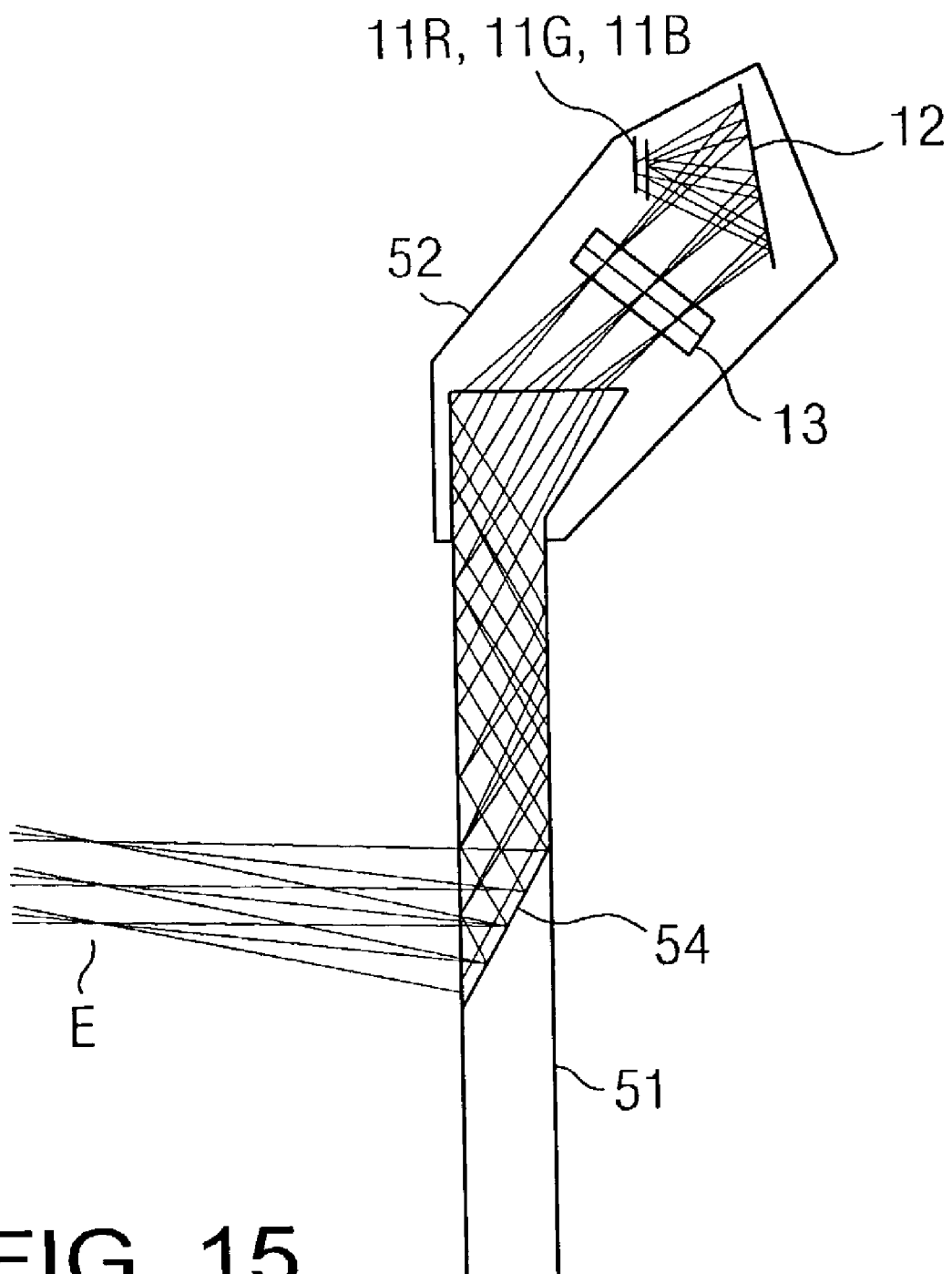
FIG. 15 is a cross-sectional view schematically showing an optical structure of the display device according to the fifth embodiment.

FIG. 15 schematically shows the optical structure of the display system 5 exemplifying the case where the transmission type liquid crystal display 13 is used like the display device 1 according to the first embodiment. An upper end of the transparent plate 51 has a wedge section, and the light emitting diodes 11R, 11G and 11B, the hologram element 12 and the liquid crystal display 13 are provided in the frame 52 so that an image light from the liquid crystal display 13 slantingly enter an end surface of the transparent plate 51. The light from the liquid crystal display 13 which enters the inside of the transparent plate 51 from the end surface is totally reflected by two surfaces of the transparent plate and simultaneously goes downward.

A reflection type hologram element 54 is embedded in the center of the transparent plate 51 so as to be slanted with respect to the surface, and the hologram element 54 diffracts and reflects the light from the liquid crystal display 13 and allows the light to emit from the surface of the transparent plate 51 so as to guide it to an eye E of a user. The hologram element 54 is set so that an enlarged virtual image of an image represented by the light from the liquid crystal display 13 is formed and serves as the eyepiece optical system 15. Moreover, the hologram element 54 is set so as to allow a light from an outside of the wavelength other than an image light to transmitted therethrough by utilizing wavelength selectivity which is a character of the reflection type hologram element and, so that the enlarged virtual image of the image is superposed on an exterior image to be provided.

Figure 16:
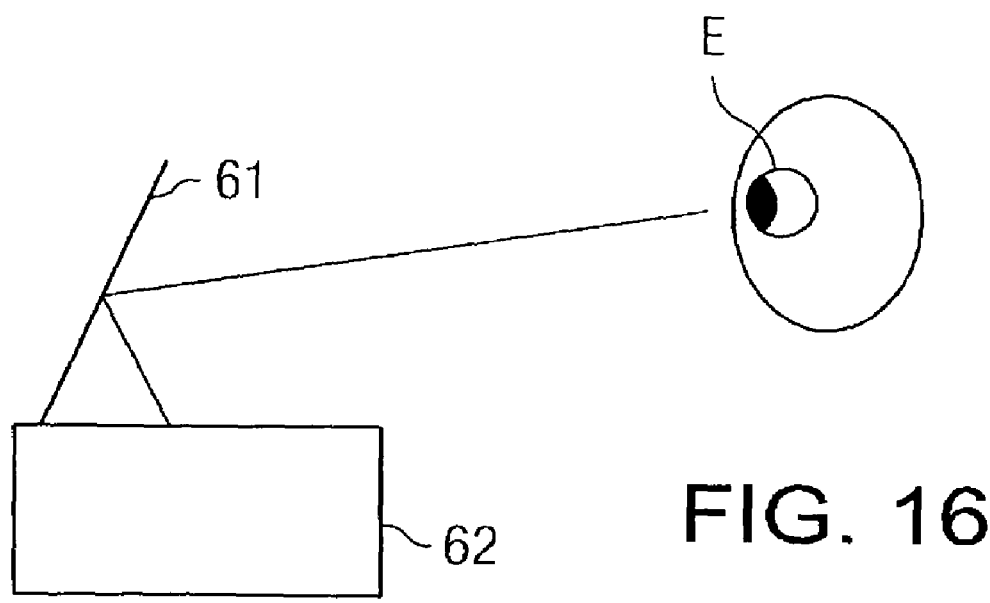
FIG. 16 is a side view schematically showing an appearance of the display device according to a sixth embodiment.
Figure 17:
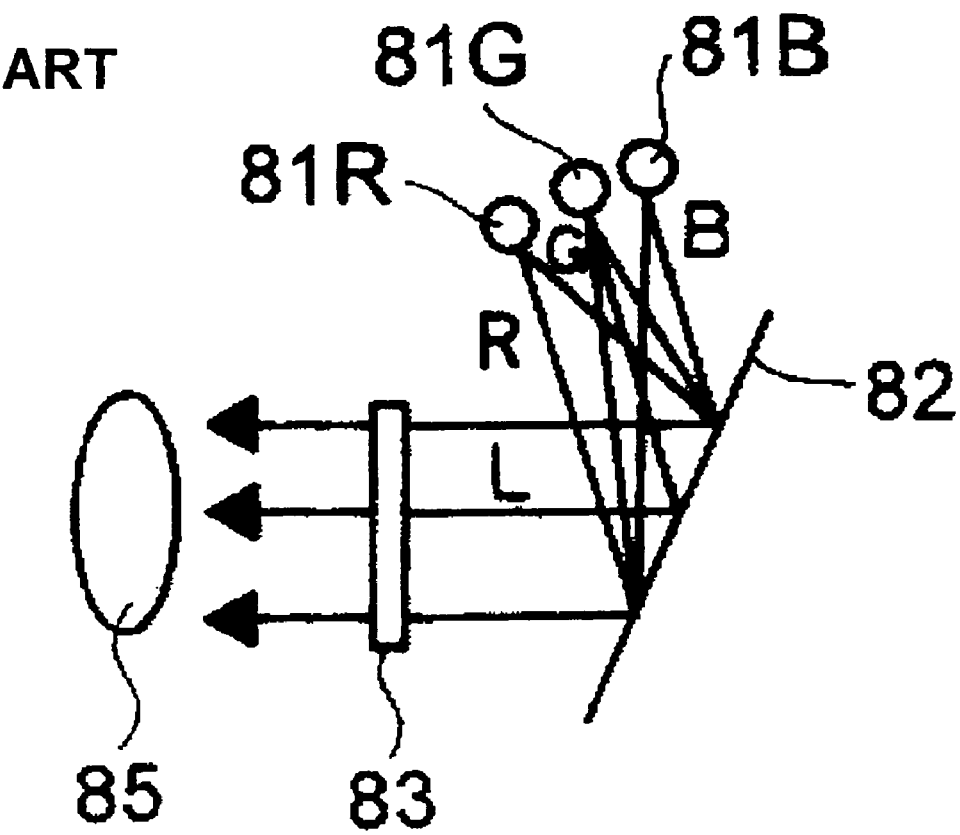
FIG. 17 is a side view schematically showing an optical structure of a conventional display device.
Figure 18:
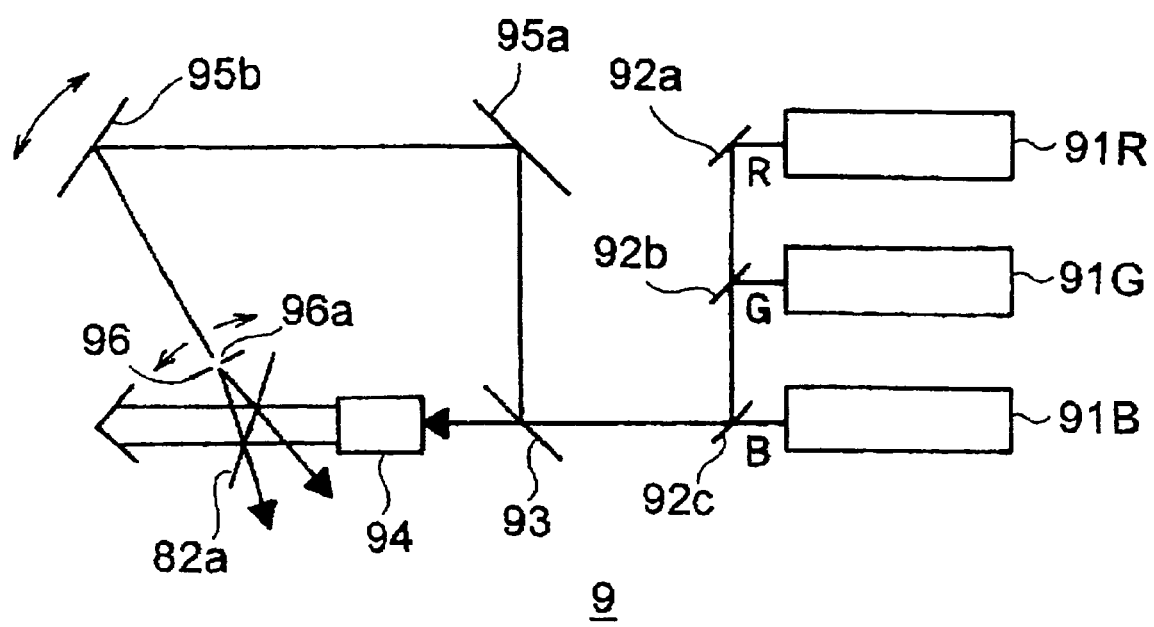
FIG. 18 is a side view schematically showing a structure of a hologram exposing device to be used for manufacturing a reflection type hologram element provided to the conventional display device.
Figure 19:
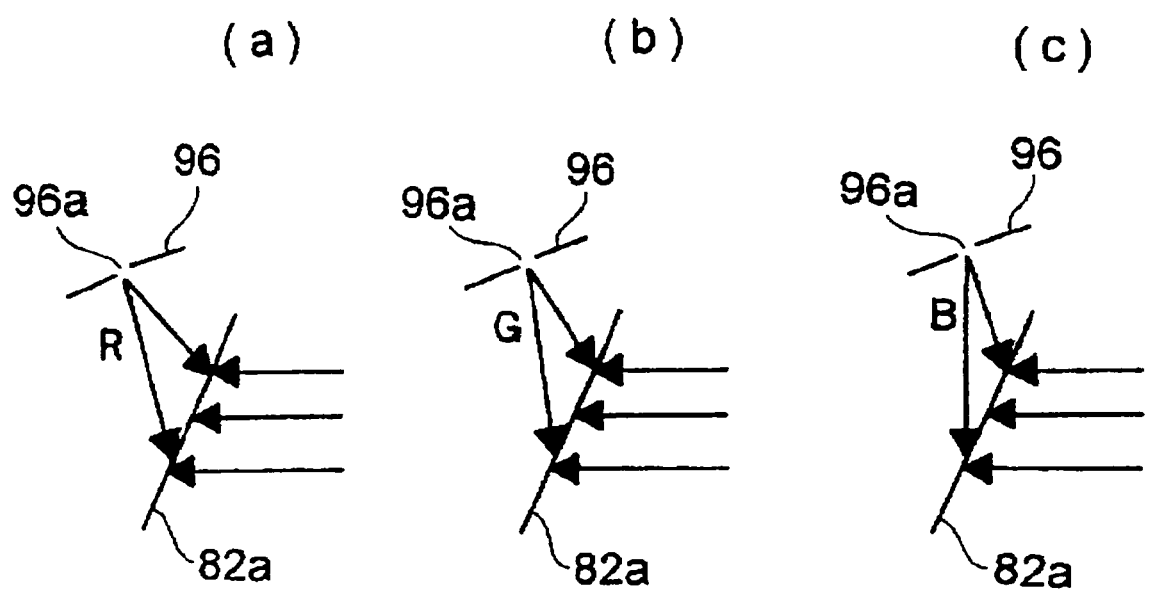
FIGS. 19(a) through 19(c) are side views schematically showing states that hologram exposure is carried out by the hologram exposing device of FIG. 18.

An projection optical system is provided instead of the eyepiece optical system 15 of the display devices 1 through 4 so that a projection type display device for forming an enlarged real image on a screen can be provided. An appearance of the projection type display device 6 according to a sixth embodiment is shown in a side view of FIG. 16. The display device 6 is composed of a folding type screen 61 and a frame 62. The frame 62 houses the components explained in the above embodiments such as the light emitting diodes 11R, 11G and 11B, the hologram element 12 and the liquid crystal display 13 or 14, and a projection type optical system. As the screen 61, a diffusing plate, a reflection type hologram element and the like can be used.

The display devices 1 through 6 according to the embodiments use the light emitting diodes as light sources, but can use another light emitting elements such as a laser diode as a light source. Moreover, instead that the light emitting elements are provided in the vicinity of the reflection type hologram element and the lights from the light emitting elements are allowed to directly enter the hologram element, a light guiding element such as an optical fiber and an optical waveguide is provided between the light emitting elements and the hologram element so that lights from the light emitting elements may be guided to the hologram element via the light guiding element.

Even if an image display element for modulating an illumination light so as to convert it into a light showing an image is used, a component other than the liquid crystal display can be used. For example, a mirror element can be also adopted as a reflection type image display element. Such a mirror element is constituted so that a lot of micro mirror blocks whose direction is changeable are arranged two-dimensionally, and the directions of the mirror blocks are changed according to an image signal so that a part of the illumination light is reflected as a light showing an image to a predetermined direction and remain of the illumination light is reflected to another direction as a light which does not show an image.

Effects of each of the present embodiment is explained below.

A display device has an image display element for modulating an incident light so as to convert it into a light showing an image, a plurality of light emitting elements for emitting lights to be given to the image display element, a reflection type hologram element which has a positive optical power for the lights from the plural light emitting elements and diffracts and reflects the lights from the plural light emitting elements to approximately one direction so as to guide the diffracted and reflected lights to the image display element, and an enlarging optical system for forming an enlarged image of an image shown by the light from the image display element. Like the present invention, this display device constituted so that the plural light emitting elements are position in a plane approximately vertical to an optical path of the light diffracted and reflected by the hologram element and the hologram element is tilted with respect to the optical path of the light diffracted and reflected by the hologram element to a direction facing the plural light emitting elements. With this structure, when the hologram element is manufactured by hologram exposure, a substrate coated with a hologram sensitizer may be rotated about a central axis of one of two light fluxes for exposure, so that the hologram element can be easily manufactured. A hologram exposing device is simplified and miniaturized. Moreover, since diffraction efficiency of the hologram element with respect to the lights form the plural light emitting elements can be high and a difference in the diffraction efficiency can be small, the lights from the light emitting elements can be utilized effectively for illuminating the image display element.

When the plural light emitting elements emit lights with different wavelengths and the hologram element has a peak of the diffraction and reflection efficiency for the respective wavelengths of the lights emitted from the plural light emitting elements, a bright color image can be provided.

The image display element is of a reflection type which reflects and modulates a light is constituted so as to reflect the lights diffracted and reflected by the hologram element to a direction with angle difference with respect to the incident direction and so that the hologram element allows the light from the image display element to transmit so as to guide it to the enlarging optical system. With this structure, an optical path from the light emitting elements to the enlarging optical system becomes short, so that the device can be miniaturized. Further, the hologram element is commonly used for illuminating the image display element and separating the optical paths of the illumination light and the image light, so that the miniaturization can be easily achieved.

A polarization selecting element for transmitting a predetermined polarizing component and reflecting another polarizing component is provided among the plural light emitting elements and the image display element and the hologram element, and the image display element is of a reflection type which reflects and modulates a light, and the polarizing component which transmits through the polarization selecting element is modulated and is reflected by the polarization selecting element, and the polarization selecting element allows a part of the lights from the plural light emitting elements to transmit so as to guide them to the hologram element and allows the lights diffracted and reflected by the hologram element to transmit so as to guide them to the image display element and reflects the lights from the image display element so as to guide them to the enlarging optical system. With this structure, an illumination light can be allowed to enter the image display element vertically and this structure can be suitable to the case where the image display element where an incident angle of the illumination light cannot be too large is used.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A display device comprising:
   a plurality of light emitting elements for emitting lights;
   a display element for modulating the light emitting from the plurality of light emitting elements so as to convert it to an image light showing an optical image;
   a reflection type hologram element, having a positive optical power with respect to the lights from the plural light emitting elements, for diffracting and reflecting the lights from the plural light emitting elements to approximately one direction so as to guide the diffracted and reflected lights to the display element; and
   an enlarging optical system for forming an enlarged image of the optical image converted by the lights from the image display element,
   wherein the plural light emitting elements are positioned in a plane such that an optical path of the lights diffracted and reflected by the hologram element is approximately orthogonal to the plane, and
   wherein the hologram element is tilted to a direction facing the plural light emitting elements with respect to the optical path of the lights diffracted and reflected by the hologram element.

2. The display device as claimed in claim 1, wherein the plural light emitting elements emit lights with different wavelengths and the hologram element has a peak of diffraction and reflection efficiency with respect to the wavelengths of the lights emitted from the plural light emitting elements.

3. The display device as claimed in claim 1, wherein the display element is of a reflection type which reflects and modulates the light, and reflects the lights diffracted and reflected by the hologram element to a direction with an angle difference with respect to an incident direction and the hologram element allows the lights from the display element to transmit so as to guide them to the enlarging optical system.

4. The display device as claimed in claim 1, wherein the enlarging optical system is an eyepiece optical system.

5. The display device as claimed in claim 1, wherein the display device is a transmission type liquid crystal display.

6. The display device as claimed in claim 1, wherein the display device is a reflection type liquid crystal display.

7. The display device as claimed in claim 1, further comprising:
   a prism provided between the hologram element and the display device.

8. The display device as claimed in claim 1, further comprising:
   two polarizing plates provided on the optical path.

9. The display device as claimed in claim 1, further comprising:
   a polarization selecting element provided on the optical path.

10. A display device as claimed in claim 4, wherein the eyepiece optical system comprises the eyepiece lens of eyeglass.

11. A display device as claimed in claim 10, further comprising:
    a hologram element diffracting and reflecting the light from the display element and guiding it to an eye E of a user, the hologram element serving as an eyepiece optical system.

* * * * *